US012743147B2

(12) United States Patent
Park et al.

(10) Patent No.: US 12,743,147 B2
(45) Date of Patent: Sep. 22, 2026

(54) SLEEP MODE MANAGEMENT OF HARD DISK DRIVE

(71) Applicant: Hewlett-Packard Development Company, L.P., Spring, TX (US)

(72) Inventors: Sanghyun Park, Seongnam Si (KR); Jungjin Park, Seongnam Si (KR); Joonhyung Hwangbo, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 91 days.

(21) Appl. No.: 18/868,059

(22) PCT Filed: Nov. 2, 2022

(86) PCT No.: PCT/US2022/048662
§ 371 (c)(1),
(2) Date: Nov. 21, 2024

(87) PCT Pub. No.: WO2023/234960
PCT Pub. Date: Dec. 7, 2023

(65) Prior Publication Data

US 2025/0328183 A1 Oct. 23, 2025

(30) Foreign Application Priority Data

May 31, 2022 (KR) ........................ 10-2022-0066908

(51) Int. Cl.
*G06F 1/3234* (2019.01)
*G06F 1/3221* (2019.01)

(52) U.S. Cl.
CPC .......... *G06F 1/3268* (2013.01); *G06F 1/3221* (2013.01); *G06F 1/3284* (2013.01)

(58) Field of Classification Search
CPC ..... G06F 1/3268; G06F 1/3221; G06F 1/3284
See application file for complete search history.

(56) References Cited

U.S. PATENT DOCUMENTS

| | | | | |
|---|---|---|---|---|
| 9,021,275 | B1 * | 4/2015 | Greenan | G06F 3/0634 713/300 |
| 11,019,227 | B2 | 5/2021 | Ogawa | |
| 2008/0162159 | A1 * | 7/2008 | Wang | G06F 21/123 705/1.1 |
| 2010/0271919 | A1 * | 10/2010 | Kaneko | G11B 27/36 |
| 2014/0258745 | A1 * | 9/2014 | Ehrlich | G06F 3/0625 713/320 |
| 2014/0281625 | A1 * | 9/2014 | Younger | G06F 1/3206 713/323 |
| 2015/0055243 | A1 * | 2/2015 | Ehrlich | G11B 19/2072 360/69 |

(Continued)

*Primary Examiner* — Aurel Prifti
(74) *Attorney, Agent, or Firm* — Foley & Lardner LLP

(57) ABSTRACT

An example image forming apparatus includes a hard disk unit including a head unit, and a controller. The controller is to obtain first time information corresponding to the image forming apparatus and usage time information of the image forming apparatus, obtain second time information corresponding to the head unit and driving information of the head unit, and manage a sleep mode of the hard disk unit based on the first time information, the second time information, the usage time information, and the driving information.

13 Claims, 10 Drawing Sheets

(56) References Cited

U.S. PATENT DOCUMENTS

| | | | | |
|---|---|---|---|---|
| 2015/0177817 | A1* | 6/2015 | Badri | G06F 1/3231 713/320 |
| 2015/0193325 | A1* | 7/2015 | Harsan-Farr | G06F 11/008 702/186 |
| 2016/0218751 | A1* | 7/2016 | Goker | G06F 3/0655 |
| 2018/0130494 | A1* | 5/2018 | Chatradhi | G11B 5/455 |
| 2018/0364793 | A1 | 12/2018 | Wang | |
| 2020/0043525 | A1* | 2/2020 | Yamada | G11B 5/09 |
| 2020/0213454 | A1 | 7/2020 | Ogawa | |
| 2023/0142716 | A1* | 5/2023 | Han | G06F 1/3221 713/330 |

* cited by examiner

FIG. 7B

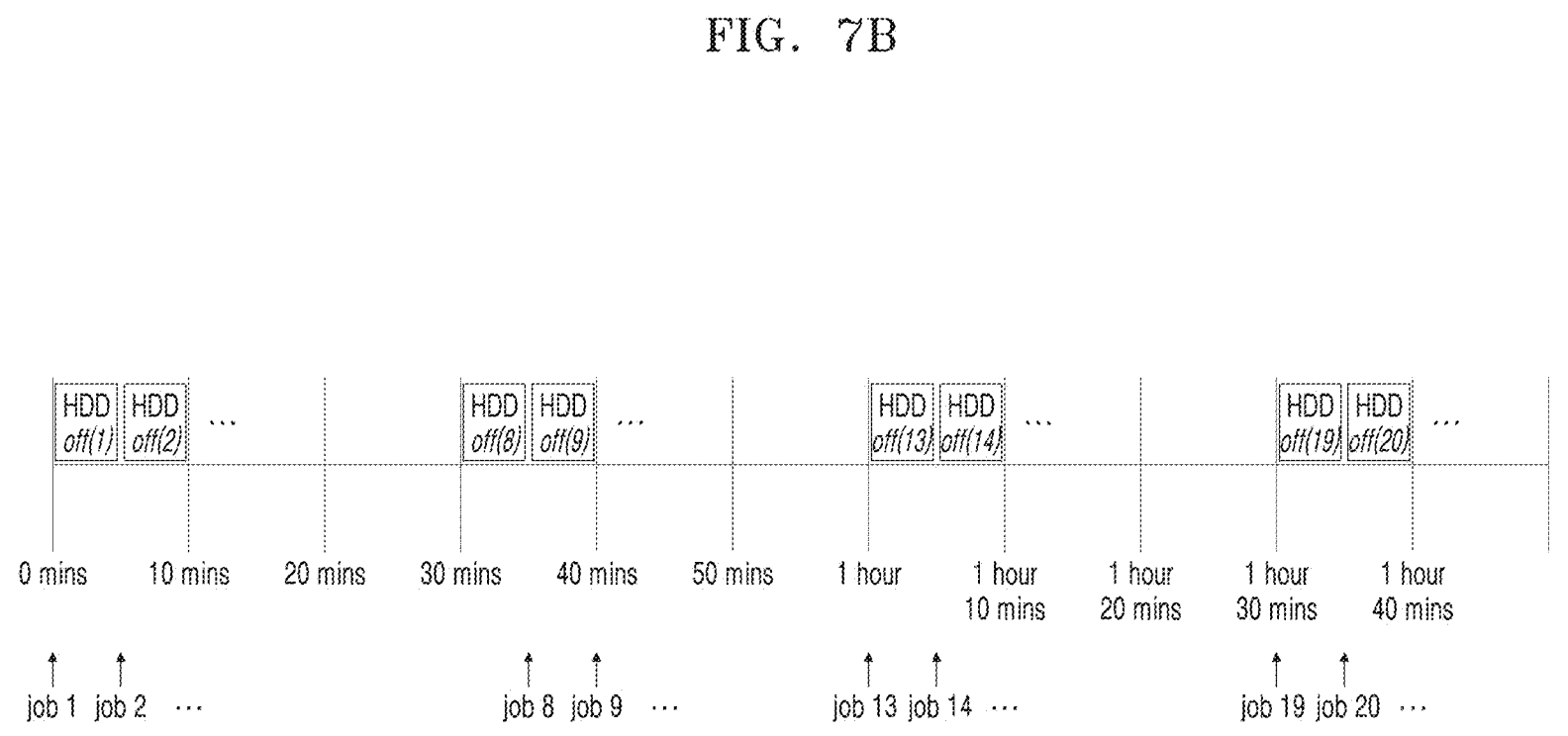

HDD off(1) HDD off(2) …
HDD off(8) HDD off(9) …
HDD off(13) HDD off(14) …
HDD off(19) HDD off(20) …

0 mins
10 mins
20 mins
30 mins
40 mins
50 mins
1 hour
1 hour 10 mins
1 hour 20 mins
1 hour 30 mins
1 hour 40 mins job 1 job 2 …
job 8 job 9 …
job 13 job 14 …
job 19 job 20 …

SLEEP MODE MANAGEMENT OF HARD DISK DRIVE

BACKGROUND

The energy efficiency of an image forming apparatus and a peripheral device connected thereto may be increased through a sleep mode. The power consumption of a hard disk included in an image forming apparatus may also be controlled through the sleep mode.

BRIEF DESCRIPTION OF THE DRAWINGS

Various examples will be described below by referring to the following figures:

FIGS. 7A and 7B are views for explaining an operation process in a normal sleep mode and a fast sleep mode, according to another example.

DETAILED DESCRIPTION

Figure 1:
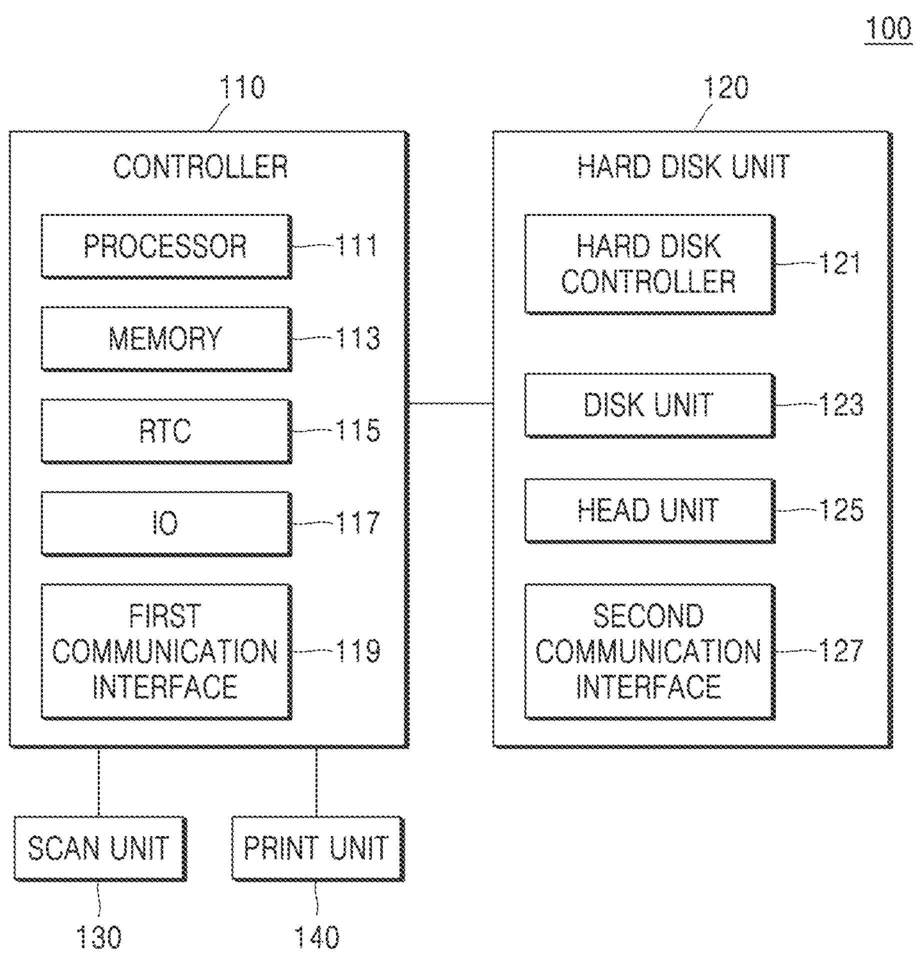
FIG. 1 is a block diagram of an image forming apparatus according to an example.

To improve energy efficiency, the standby power of an image forming apparatus may be reduced. However, a hard disk of an image forming apparatus includes mechanical elements unlike other components of the image forming apparatus. Therefore, frequent power control may cause mechanical wear or damage. As an example, based on sleep and wakeup being frequently repeated due to fast power control, the stability of the hard disk may be reduced. Accordingly, examples described herein provide a technology for adaptively identifying the sleep mode of a hard disk and controlling the hard disk to prevent damage to the hard disk and increasing energy efficiency by controlling entrance to the sleep mode more frequently.

In an example, an image forming apparatus may include a hard disk unit including a head unit, and a controller to obtain first time information corresponding to the image forming apparatus, usage time information of the image forming apparatus, second time information corresponding to the head unit, and driving information of the head unit, and manage a sleep mode of the hard disk unit based on the first time information, the second time information, the usage time information, and the driving information.

For example, the controller may identify a driving allowed value of the head unit at a sleep mode management time point based on the first time information, the second time information, and the usage time information, and may manage the sleep mode of the hard disk unit based on the driving allowed value and the driving information.

For example, the driving information may include at least a portion of Self-Monitoring, Analysis and Reporting Technology (SMART) information of the hard disk unit. As an example, the driving information may include at least one of Load Cycle Count (LCC), Loaded Hours, Load/Unload Retry Count, Load Friction, Load/Unload Cycle Count, Load 'In'-time, or the like.

For example, the controller may identify an allowed number of times of the LCC based on the first time information, the usage time information, and an upper limit of the LCC. The driving information may include the LCC of the hard disk unit and the second time information may include the upper limit of the LCC.

For example, the controller may identify whether a condition for the hard disk unit to enter the sleep mode is satisfied, may identify whether the LCC is less than the allowed number of times of the LCC, and, based on the condition being satisfied and the LCC being less than the allowed number of times of the LCC, may control the hard disk unit to enter the sleep mode.

For example, based on the condition being satisfied and the LCC being greater than or equal to the allowed number of times of the LCC, the controller may wait for a certain standby time and may control the hard disk unit to enter the sleep mode.

For example, the controller may identify a usage time, based on a current time using a real time clock (RTC) and a user installation date or a manufacturing date.

Based on a certain example may being implemented differently, a process order may be performed differently from the described order. For example, two consecutively described processes may be performed substantially at the same time or performed in an order opposite to the described order. The term '~unit' or '~er(or)' used in the description indicates a machine readable instruction or hardware component, and the term '~unit' or '~er(or)' is to performs certain roles. However, the term 'unit' or '~er(or)' is not limited to machine readable instructions or hardware. The term 'unit' or '~er(or)' may be included in an addressable storage medium or a processor.

Examples are described herein with reference to the accompanying drawings. The disclosure may, however, be embodied in many different forms and should not be construed as being limited to the examples set forth herein.

An image forming apparatus used herein may be any type of device capable of performing an image forming job, such as a printer, a copier, a scanner, a fax machine, a multi-function printer (MFP), a display device, or the like.

A hard disk or a hard disk drive (HDD) used herein may be a non-volatile, sequentially accessible secondary storage device. The hard disk may include a head, an arm, and at least one platter, and may rotate the platter by using a spindle motor and move the arm to a designated position by using a head actuator. The head included in the hard disk may read, store, or delete information by magnetizing or erasing a magnetic material coated on the surface of the platter.

A sleep mode or standby mode used herein may be a mode that limits some functions of a device or shuts down power based on the device not being used during a certain time period of inactivity to save energy. For example, the sleep mode or standby mode may be a state designed so that a hard disk is spun down based on it not being used for a certain period of time. A sleep mode or standby mode for the hard disk may be a state in which the platter has stopped spinning. Based on the hard disk in the "sleep mode" state being accessed, a file may be opened or stored, or based on there being a job on a device, the platter may spin and the hard disk may enter an active mode.

SMART is an abbreviation for self-monitoring, analysis and reporting technology, and SMART information may include information about various internal and external problems of the hard disk. For example, the SMART information may include information for monitoring information, such as the number of bad blocks, the number of errors, an increase in start/stop cycles, a rise in airflow temperature, or the like. The information may be provided to a user to protect the user from data loss such as logical damage, physical damage, destruction, or the like.

may read, store, or delete data by magnetizing or erasing a coated magnetic material. The disk unit 123 may include a spindle and may rotate and stop a platter under a control of the hard disk controller 121.

The hard disk controller 121 is to control an operation of the hard disk unit 120 by controlling each of the disk unit 123, the head unit 125, and the second communication interface 127. For example, the hard disk controller 121 may control rotation of the disk unit 123 and may read and write data by the head unit 125. The hard disk controller 121 may store the SMART information.

Table 1 illustrates SMART information that may be stored in the hard disk controller 121.

TABLE 1

| ID | Attribute name | Description |
|---|---|---|
| 1930xC1 | Load Cycle Count or Load/Unload Cycle Count (Fujitsu) | Count of load/unload cycles into head landing zone position. Some drives use 225 (0xE1) for Load Cycle Count instead. Western Digital rates their VelociRaptor drives for 600,000 load/unload cycles, and WD Green drives for 300,000 cycles; the latter ones are designed to unload heads often to conserve power. On the other hand, the WD3000GLFS (a desktop drive) is specified for only 50,000 load/unload cycles. Some laptop drives and "green power" desktop drives are programmed to unload the heads whenever there has not been any activity for a short period, to save power. Operating systems often access the file system a few times a minute in the background, causing 100 or more load cycles per hour if the heads unload: the load cycle rating may be exceeded in less than a year. There are programs for most operating systems that disable the Advanced Power Management (APM) and Automatic acoustic management (AAM) features causing frequent load cycles. |
| 2220xDE | Loaded Hours | Time spent operating under data load (movement of magnetic head armature). |
| 2230xDF | Load/Unload Retry Count | Count of times head changes position. |
| 2240xE0 | Load Friction | Resistance caused by friction in mechanical parts while operating. |
| 2250xE1 | Load/Unload Cycle Count | Total count of load cycles [36] Some drives use 193 (0xC1) for Load Cycle Count instead. See Description for 193 for significance of this number. |
| 2260xE2 | Load 'In'-time | Total time of loading on the magnetic heads actuator (time not spent in parking area). |

FIG. 1 is a block diagram of an image forming apparatus 100 according to an example.

Referring to FIG. 1, the image forming apparatus 100 may include a controller 110, a hard disk unit 120, a scan unit 130, and a print unit 140. However, the image forming apparatus 100 may be implemented by more or fewer components than those illustrated in FIG. 1. Examples of the aforementioned components will now be described.

The scan unit 130 may perform a scan operation under a control by the controller 110, and the print unit 140 may perform a print operation under a control by the controller 110.

The hard disk unit 120 may store data of the image forming apparatus 100 and user data.

As illustrated in FIG. 1, the hard disk unit 120 may include a hard disk controller 121, a disk unit 123, a head unit 125, and a second communication interface 127. The hard disk unit 120 may be implemented by more or fewer components than those illustrated in FIG. 1.

The second communication interface 127 may receive or transmit data for the hard disk unit 120. The head unit 125

The Load Cycle Count (LCC) is the count of load cycles into a landing zone position of a hard disk head. Loaded Hours in Table 1 is a time spent to operate under a data load. Load/Unload Retry Count is the count of times the hard disk head changes its position. Load Friction is a friction resistance of mechanical parts while operating. Load 'In'-time is a time during which the hard disk head is not located in a parking area.

SMART information according to another example may be stored in the disk unit 123 other than the hard disk controller 121.

The hard disk unit 120 may store at least one information among Load Cycle Count, Loaded Hours, Load/Unload Retry Count, Load Friction, Load/Unload Cycle Count, and Load 'In'-time according to an operation of the head unit 125.

The hard disk unit 120 may be controlled by the controller 110 to transmit the SMART information stored in the hard disk controller 121. For example, the hard disk unit 120 may be controlled by the controller 110 to transmit at least one piece of information among Load Cycle Count, Loaded Hours, Load/Unload Retry Count, Load Friction, Load/Unload Cycle Count, and Load 'In'-time of the head as the driving information to the controller 110.

The driving information of the head unit 125 may include information about a state in which the head unit 125 has been driven by the hard disk unit 120 performing an operation.

As shown in FIG. 1, the controller 110 includes a processor 111, a memory 113, a real time clock (RTC) 115, an input/output (IO) 117, and a first communication interface 119. However, examples of the disclosure are not limited thereto.

The controller 110 may control an operation of the image forming apparatus 100 according to an example of the disclosure. The controller 110 may manage an operation state of the image forming apparatus 100 or may control the power of the hard disk unit 120.

The memory 113 may store at least one of first time information, second time information, a user installation date, a manufacturing date of the image forming apparatus 100, or the like.

The memory 113 may be implemented by the hard disk unit 120 or may be included as a separate component in the controller 110. The memory 113 may include a boot read only memory (ROM) containing booting machine readable instructions for an image forming apparatus or machine readable instructions to operate the image forming apparatus, a random access memory (RAM), which is a temporary storage, to temporarily write and read data to execute a program, and a non-volatile RAM (NVRAM) to store and manage setting values, such as a manufacturing date, a user installation date, and a serial number of the image forming apparatus, or a user ID and a password, which are pieces of user main information. The memory 113 may be a non-volatile memory (including RAM or flash memory), ROM, electrically erasable programmable read only memory (EEPROM), a magnetic disc storage device, a compact disc (CD)-ROM, a digital versatile disc (DVD), another optical storage device, a magnetic cassette, or the like.

The RTC 115, which is an electronic device to measure the lapse of time, may check a current time. The IO 117 is an input/output interface to control a peripheral device and check an input/output to the outside. The first communication interface 119 may receive data from the hard disk unit 120 and transmit the data to the hard disk unit 120.

The processor 111 may control the controller 110. The processor 111 may check the current time by using the RTC 115 and may identify usage time information based on a user installation date or a manufacturing date stored in the memory 113. The usage time information may be a period of use with respect to the image forming apparatus 100. For example, an elapsed time period from the user installation date to the current time may be identified as a usage time period, or an elapsed time from the manufacturing date to the current time may be identified as the usage time period.

The processor 111 may be implemented as a single central processing unit (CPU) or a plurality of CPUs (e.g., a digital signal processor (DSP), a system on chip (SoC), etc.). The processor 111 may be implemented as a DSP, a microprocessor, or a time controller (TCON). However, the disclosure is not limited thereto, and the processor 111 may include at least one of a CPU, a micro controller unit (MCU), a micro processing unit (MPU), a controller, an application processor (AP), a communication processor (CP), an ARM processor, or the like, and may be indicated by the aforementioned terms.

The controller 110 may obtain the first time information of the image forming apparatus 100 and the usage time information of the image forming apparatus 100.

The first time information may include information about a time period or expected lifespan guaranteed to operate normally with respect to the image forming apparatus 100. For example, the first time information may be a value stored in the memory 113, a value input by a user or a service engineer, a value derived by the controller 110, or the like. The controller 110 may obtain the first time information from the memory 113, may receive and obtain the first time information from a user or a service engineer, may derive the first time information from separate information, or the like.

As described above, the usage time information may be a period of use of with respect to the image forming apparatus 100. For example, the usage time information may be identified as the elapsed time from the user installation date to the current time or may be identified as the elapsed time from the manufacturing date to the current time. Furthermore, the usage time information may be an elapsed time from a date input by the service engineer to the current time. The controller 110 may check the current time by using the RTC 115 and may obtain the usage time information through an elapsed time from the user installation date to the current time or from the manufacturing date stored in the memory 113 to the current time.

The controller 110 may obtain the driving information of the head unit 125 and the second time information corresponding to the head unit 125.

The driving information according to an example may include at least one of LCC, Loaded Hours, Load/Unload Retry Count, Load Friction, Load/Unload Cycle Count, or Load 'In'-time. The controller 110 may receive the SMART information by controlling the hard disk unit 120, and the controller 110 may obtain the driving information of the head unit from the received SMART information.

The second time information may be information about a time period or information guaranteed to operate normally with respect to the hard disk unit 120. For example, at least one of an upper limit of the LCC, a Loaded Hours upper limit, a Load/Unload Retry Count upper limit, a Load Friction upper limit, a Load/Unload Cycle Count upper limit, or a Load 'In'-time upper limit may be included as information about the product specifications of a hard disk manufacturer. The controller 110 may obtain the second time information from the memory 113 or may receive and obtain the second time information from the user or the service engineer.

The controller 110 may manage a sleep mode of the hard disk unit 120 based on the first time information, the usage time information, the second time information, and the driving information. The controller 110 may identify the driving allowed value of the head unit at a sleep mode management time point based on the first time information, the usage time information, and the second time information, and may manage the sleep mode of the hard disk unit 120 based on the driving allowed value and the driving information.

The controller 110 may identify the driving allowed value based on a pre-set first value and a pre-set second value input by the user or the service engineer, and may manage the sleep mode of the hard disk unit 120 based on the driving allowed value and the driving information. The pre-set first value may be a value identified by the service engineer based on the first time information corresponding to the image forming apparatus and the second time information corresponding to the head unit.

The driving allowed value may be information for limiting the use of the head unit of the hard disk unit 120 and preventing damage to the head unit.

The driving information according to an example may include the LCC included in the SMART information and the second time information may include the upper limit of the LCC included in the SMART information of the hard disk unit. The controller 110 may identify the allowed number of times of the LCC as the driving allowed value based on the first time information, the usage time information, and the upper limit of the LCC The allowed number of times of the LCC may be calculated using Equation 1 below.

$$LCC_{allowed} = \frac{LCC_{limit}}{t_{warranty}} \times t_{usage} + N \qquad \text{Equation 1}$$

In Equation 1, $LCC_{allowed}$ indicates the allowed number of times of the LCC, $LCC_{limit}$ indicates the upper limit of the LCC, $t_{warranty}$ indicates a first time, $t_{usage}$ indicates a usage time, and N indicates a value allowed for a certain amount of time or a certain number of times to achieve an optimal effect.

The controller 110 according to an example may identify the allowed number of times of the LCC as the driving allowed value based on the pre-set first and second values input by the service engineer. The pre-set first value may be a value identified by the service engineer based on the upper limit of the LCC and the first time information.

The allowed number of times of the LCC may be identified using Equation 2 below.

$$LCC_{allowed} = \alpha \times t_{usage} + \beta \qquad \text{Equation 2}$$

In Equation 2, $LCC_{allowed}$ indicates the allowed number of times of the LCC, α indicates the pre-set first value, β indicates the pre-set second value, and $t_{usage}$ indicates a usage time.

The controller 110 may manage the sleep mode of the hard disk unit 120 based on the allowed number of times of the LCC as the driving allowed value and the LCC as the driving information.

The controller 110 may identify whether a condition for the hard disk unit 120 to enter the sleep mode is satisfied. For example, the condition for the hard disk unit 120 to enter the sleep mode may be a case where the processor 111 has entered an idle mode, a case where an input/output signal is transmitted or not transmitted from the IO 117 for a specific time period, and/or a case where the image forming apparatus does not use a hard disk for a specific time period.

Thereafter, the controller 110 may identify whether the LCC is less than the allowed number of times of the LCC. Based on the condition for the hard disk unit 120 to enter the sleep mode being satisfied and the LCC being less than the allowed number of times of the LCC, the controller 110 may control the hard disk unit 120 to enter a fast sleep mode. For example, the controller 110 may control the hard disk unit 120 to enter the sleep mode right after the condition for the hard disk unit 120 to enter the sleep mode is satisfied. Alternatively, the controller 110 may control the hard disk unit 120 to enter the sleep mode after standing by for a certain first standby time period.

Based on the condition for the hard disk unit 120 to enter the sleep mode being satisfied and the LCC being equal to or greater than the allowed number of times of the LCC, the controller 110 may control the hard disk unit 120 to enter a normal sleep mode. For example, the controller 110 may identify the hard disk unit 120 to stand by for a certain second standby time period and enter the sleep mode based on the condition for the hard disk unit 120 to enter the sleep mode being satisfied. The second standby time period may be an arbitrary time period that is greater than the first standby time period and is previously identified. As an example, based on the first standby time period being 20 seconds, the second standby time period may be 10 minutes.

Figure 2:
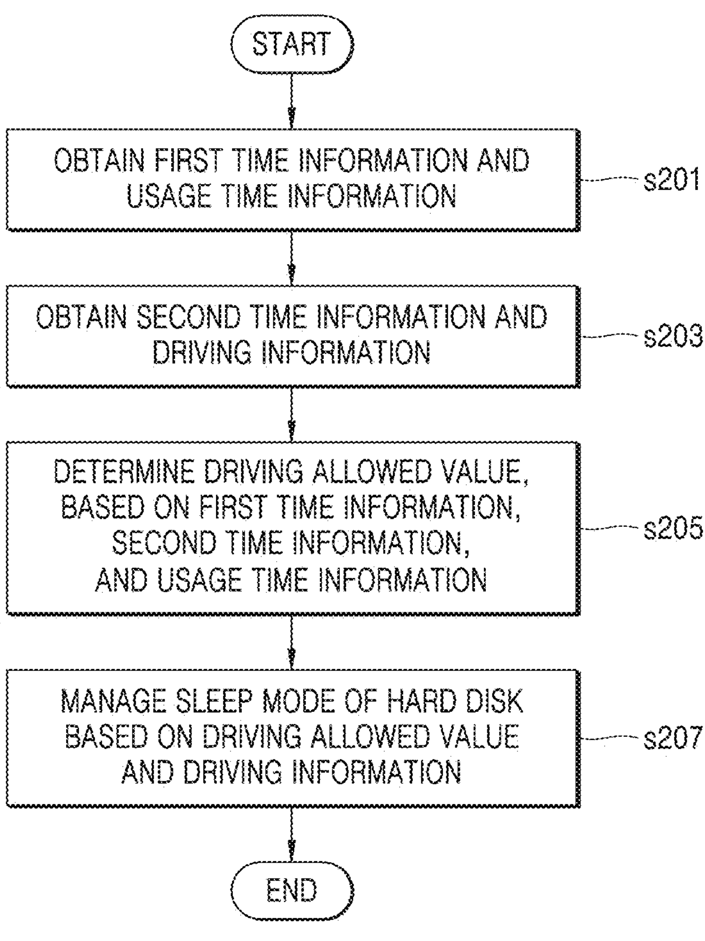
FIG. 2 is a flowchart of an operation method of an image forming apparatus, according to an example.

FIG. 2 is a flowchart of an operation method of an image forming apparatus, according to an example.

Referring to FIG. 2, the image forming apparatus may obtain first time information corresponding to the image forming apparatus and usage time information of the image forming apparatus in operation S201. For example, the image forming apparatus may obtain the first time information from a memory, may receive and obtain the first time information from a user or a service engineer, or may derive the first time information from separate information. The image forming apparatus may also obtain usage time information identified by a processor.

The image forming apparatus may identify the usage time information based on a current time, a user installation date, or a manufacturing date. For example, the image forming apparatus may check a current time using an RTC and a stored user installation date or manufacturing date. The image forming apparatus may identify an elapsed time period from the user installation date to the current time as a use time period, or may identify an elapsed time from the manufacturing date to the current time as the usage time period.

In operation S203, the image forming apparatus may obtain driving information of a head unit and the second time information corresponding to the head unit.

As an example, the image forming apparatus may receive SMART information from a hard disk unit and may obtain the driving information of the head unit from the received SMART information. The image forming apparatus may obtain the second time information corresponding to the head unit from the memory, may receive and obtain the second time information from a user or a service engineer, or may derive the second time information from separate information.

The driving information according to an example may include at least one of LCC, Loaded Hours, Load/Unload Retry Count, Load Friction, Load/Unload Cycle Count, or Load 'In'-time, and the second time information may include at least one of the upper limit of the LCC, the Loaded Hours upper limit, the Load/Unload Retry Count upper limit, the Load Friction upper limit, the Load/Unload Cycle Count upper limit, or the Load 'In'-time upper limit.

The image forming apparatus may manage a sleep mode of the hard disk unit based on the obtained first time information, the obtained usage time information, the obtained second time information, and the obtained driving information.

As an example, the image forming apparatus may identify a driving allowed value of the head unit at a sleep mode management time point based on the first time information, the usage time information, and the second time information in operation S205.

For example, based on the driving information including the LCC and the second time information including the upper limit of the LCCs, the image forming apparatus may identify the allowed number of times of the LCC as the driving allowed value based on the first time information, the usage time information, and the upper limit of the LCCs.

The allowed number of times of the LCC may be identified using Equation 3 below.

$$LCC_{allowed} = \frac{LCC_{limit}}{t_{warranty}} \times t_{usage} + N \quad \text{Equation 3}$$

In Equation 3, $LCC_{allowed}$ indicates the allowed number of times of the LCC, $LCC_{limit}$ indicates the upper limit of the LCC, $t_{warranty}$ indicates a first time, $t_{usage}$ indicates a usage time, and N indicates a value allowed for a certain amount of time or a certain number of times to achieve an optimal effect.

In operation S207, the image forming apparatus may manage the sleep mode of the hard disk unit based on the driving allowed value and the driving information of the head unit. For example, based on the driving information including the LCC included in the SMART information, the image forming apparatus may manage the sleep mode of the hard disk unit based on the LCC and the allowed number of times of the LCC.

Figure 3:
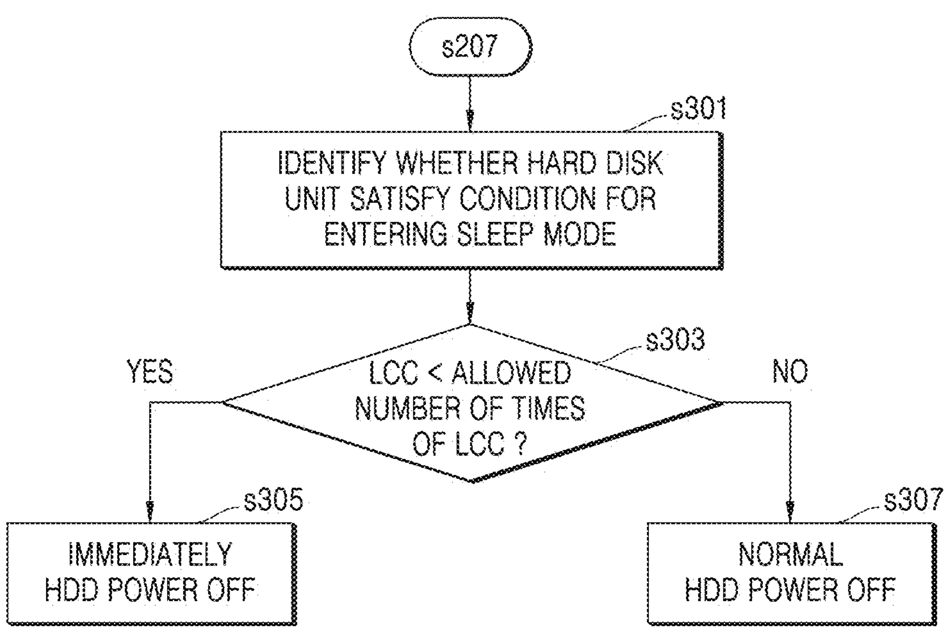
FIG. 3 is a flowchart of an operation method of an image forming apparatus related to sleep mode management, according to an example.

FIG. 3 is a flowchart of an operation method of an image forming apparatus related to sleep mode management, according to an example. An operation of the image forming apparatus in FIG. 3 may correspond to operation S207 of FIG. 2.

In operation S301, the image forming apparatus may identify whether a condition for the hard disk unit to enter a sleep mode is satisfied.

For example, the image forming apparatus may identify that the condition is satisfied based on a processor entering an idle mode, based on an input/output signal being transmitted or not transmitted from an IO for a specific time period, and/or based on the image forming apparatus not using a hard disk for a specific time period. The image forming apparatus may also identify that the condition is satisfied based on there being no subsequent operation for a specific time period after an operation is performed.

In operation S303, the image forming apparatus may identify whether to operate in a fast sleep mode or a normal sleep mode based on the driving allowed value and the driving information. For example, based on the driving information being identified by the LCC and the driving allowed value being identified by the allowed number of times of the LCC, the image forming apparatus may identify whether the LCC is less than the allowed number of times of the LCC.

Based on the condition for the hard disk unit to enter a sleep mode being satisfied and the LCC being less than the allowed number of times of the LCC, the image forming apparatus may proceed to operation S305. In operation S305, the image forming apparatus may control the hard disk unit to enter the fast sleep mode. For example, the image forming apparatus may identify the hard disk unit to enter the sleep mode right after the condition for the hard disk unit to enter the sleep mode is satisfied. Alternatively, the image forming apparatus may control the hard disk unit to enter the sleep mode after standing by for a certain first standby time period.

Based on the condition for the hard disk unit to enter a sleep mode being satisfied and the LCC being equal to or greater than the allowed number of times of the LCC, the image forming apparatus may proceed to operation S307. In operation S307, the image forming apparatus may control the hard disk unit to enter the normal sleep mode. For example, the image forming apparatus may control the hard disk unit to enter the sleep mode after standing by for a certain second standby time period.

The first standby time period and the second standby time period may be values input from a user or a service engineer, values stored in a memory, or the like. The second standby time period may be an arbitrary time period that is greater than the first standby time period. As an example, based on the first standby time period being 20 seconds, the second standby time period may be 10 minutes.

Figure 4:
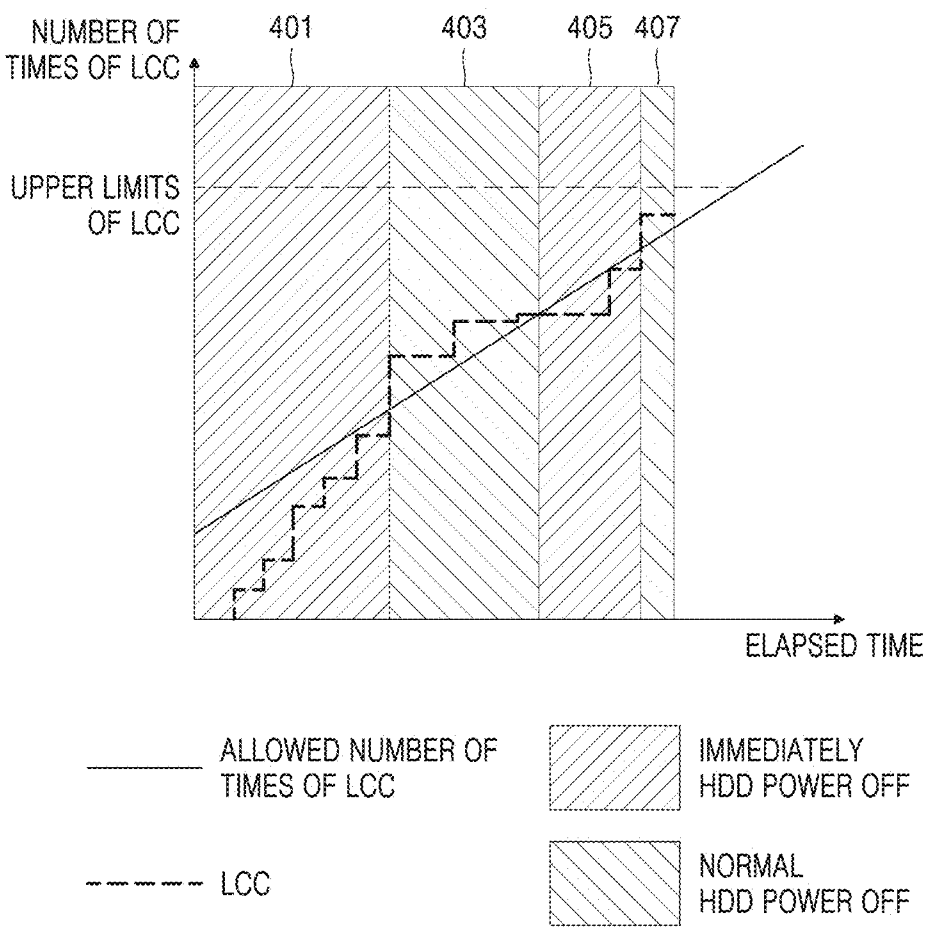
FIG. 4 is a graph showing a load cycle count (LCC) versus time and an allowed number of times of the LCC versus time, according to an example.

FIG. 4 is a graph showing an LCC versus time and an allowed number of times of the LCC versus time, according to an example.

For example, it may be assumed that the first time information corresponding to the image forming apparatus is 8 years (about 70,080 hours), the driving information of the head unit includes the LCC, and the second time information corresponding to the head unit is the upper limit of the LCCs of 600,000 times. In this case, the allowed number of times of the LCC identified as the driving allowed value may be expressed as a function according to the usage time. Based on the unit of time being hours and an initial allowed number of times of the LCC is 2500, the allowed number of times of the LCC is calculated using Equation 4 below.

$$LCC_{alowed} = \left\lfloor \frac{LCC_{limit}}{t_{warranty}} \right\rfloor \times t_{usage} + N \quad \text{Equation 4}$$

$$LCC_{allowed} = \left\lfloor \frac{600{,}000(n)}{70{,}080(\text{hour})} \right\rfloor \times t_{usage}(\text{hour}) + 2{,}500(n)$$

$$LCC_{allowed} = \lfloor 8.561 \rfloor (n/\text{hour}) \times t_{usage}(\text{hour}) + 2{,}500(n)$$

$$LCC_{allowed} = 8(n/\text{hour}) \times t_{usage}(\text{hour}) + 2{,}500(n)$$

Based on Equation 4, the allowed number of times of the LCC increases by 8 times every hour, and the LCC, which is the number of load cycles to a landing zone position of the head, has its value that increases according to the use of the hard disk. Thus, the allowed number of times of the LCC, the LCC, and a relationship between the allowed number of times of the LCC and the LCC may vary over time.

The image forming apparatus according to an example may identify the allowed number of times of the LCC as the driving allowed value based on first and second values previously set by the service engineer. For example, based on the pre-set first value being 8 and the pre-set second value being 2500, the allowed number of times of the LCC may be calculated using Equation 5 below.

$$LCC_{allowed} = \alpha \times t_{usage} + \beta \quad \text{Equation 5}$$

$$LCC_{allowed} = 8(n/\text{hour}) \times t_{usage}(\text{hour}) + 2{,}500(n)$$

Based on Equation 5, the allowed number of times of the LCC increases by 8 times every hour, and the LCC, which is the number of load cycles to the landing zone position of the head, has its value that increases according to the use of the hard disk. Thus, the allowed number of times of the LCC, the LCC, and a relationship between the allowed number of times of the LCC and the LCC may vary over time.

Referring to FIG. 4, in a first section 401 and a third section 405, the LCC is less than the allowed number of times of the LCC. The image forming apparatus may control the hard disk unit to enter the fast sleep mode based on the condition for the hard disk unit to enter the sleep mode being satisfied.

In a second section 403 and a fourth section 407, the LCC is equal to or greater than the allowed number of times of the LCC. The image forming apparatus may control the hard disk unit to enter the normal sleep mode based on the condition for the hard disk unit to enter the sleep mode being satisfied.

Figure 5:
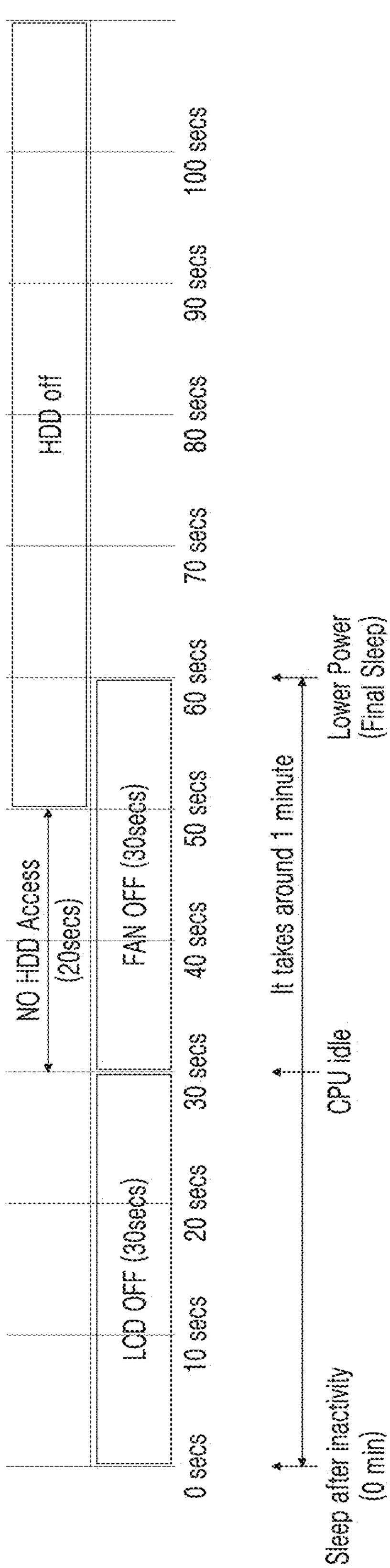
FIG. 5 is a view for explaining a sleep mode operation process according to an example.

FIG. 5 is a view for explaining a sleep mode operation process according to an example.

Referring to FIG. 5, the image forming apparatus may first identify whether a condition for the hard disk unit to enter a sleep mode is satisfied.

Based on it being identified that a condition for the hard disk unit to enter a sleep mode is satisfied, the image forming apparatus may control a display included in the image forming apparatus in the sleep mode. The image forming apparatus may identify that the processor is in the idle mode. The image forming apparatus may identify the hard disk unit to be in the sleep mode based on there being no access to the hard disk unit for a certain third standby time period from the moment that the processor is identified to be in the idle mode. The third standby time period may be identified as a fast sleep mode based on the hard disk unit being in the fast sleep mode, or may be identified as a second standby time period based on the hard disk unit being in the normal sleep mode.

As an example, in the fast sleep mode, the image forming apparatus may identify the hard disk unit to be in the sleep mode immediately from the moment that the processor is identified to be in the idle mode. Alternatively, the image forming apparatus may identify the hard disk unit to be in the sleep mode after the first standby time period.

In the normal sleep mode, the image forming apparatus may standby the second standby time period from the moment that the processor is identified to be in the idle mode, and may identify the hard disk unit to be in the sleep mode after the second standby time period. The second standby time period may be an arbitrary time period that is greater than the first standby time period and is previously identified. The second standby time period may be a time period previously set by a manufacturer based on the first time information corresponding to the image forming apparatus and the second time information of the hard disk unit. For example, the first standby time period may be 20 seconds, and the second standby time period may be 10 minutes.

Figure 6A:
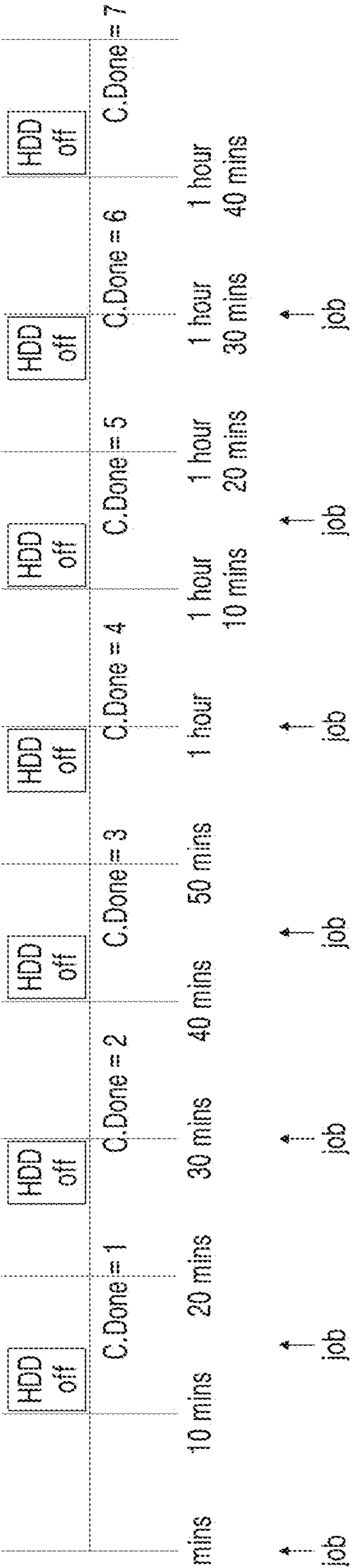
FIGS. 6A and 6B are views for explaining an operation process in a normal sleep mode and a fast sleep mode, according to an example.
Figure 6B:
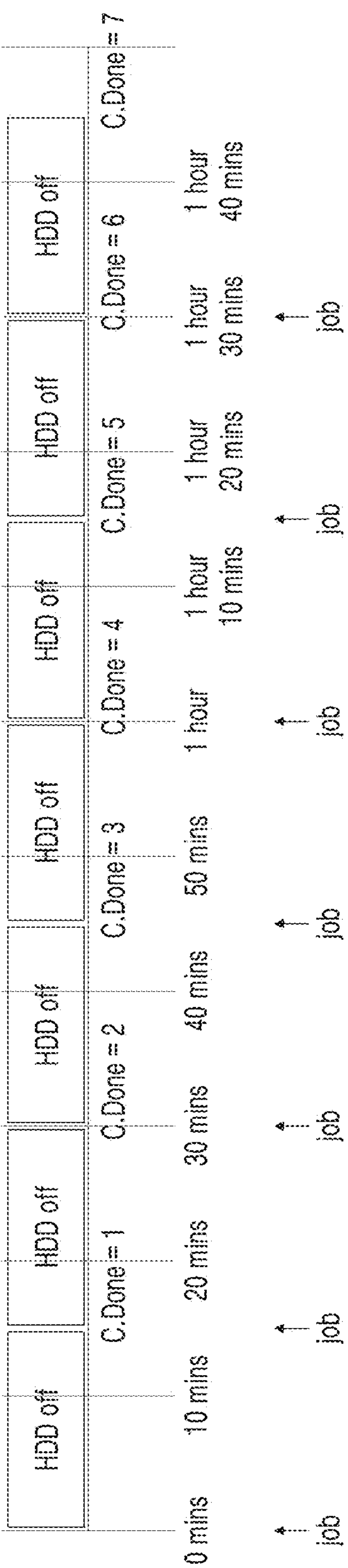

FIGS. 6A and 6B are views for explaining an operation process in a normal sleep mode and a fast sleep mode, according to an example. In FIGS. 6A and 6B, it is assumed that the image forming apparatus performs an operation at intervals of 15 minutes and the third standby time period is 10 minutes in the case of the normal sleep mode and 20 seconds in the case of the fast sleep mode.

As shown in FIGS. 6A and 6B, based on sleeping of the hard disk unit being controlled using the fast sleep mode, a sleep mode duration of the hard disk unit is longer than a situation in which sleeping of the hard disk unit is controlled using the normal sleep mode. Accordingly, more efficient hard disk unit sleep mode control may be performed by the image forming apparatus.

Figure 7A:
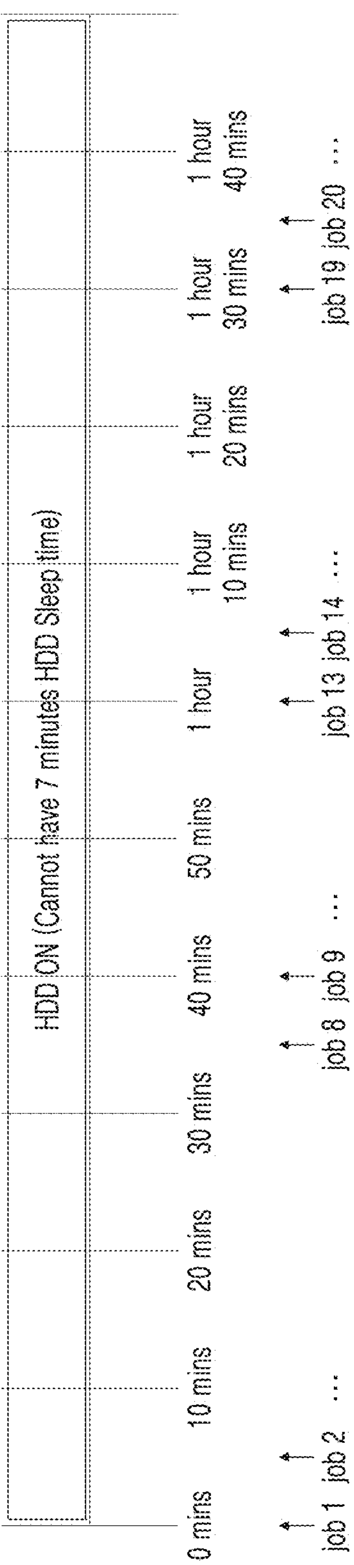

FIGS. 7A and 7B are views for explaining an operation process in a normal sleep mode and a fast sleep mode, according to another example. In FIGS. 7A and 7B, it is assumed that the image forming apparatus performs an operation at intervals of 5 minutes and the third standby time period is 10 minutes in the case of the normal sleep mode and 20 seconds in the case of the fast sleep mode.

As shown in FIGS. 7A and 7B, based on the normal sleep mode being used, the hard disk unit is unable to enter the sleep mode. However, based on the fast sleep mode being used, the hard disk unit may enter the sleep mode during a sleep mode operation interval. Accordingly, more efficient hard disk unit sleep mode control may be performed by the image forming apparatus.

Figure 8:
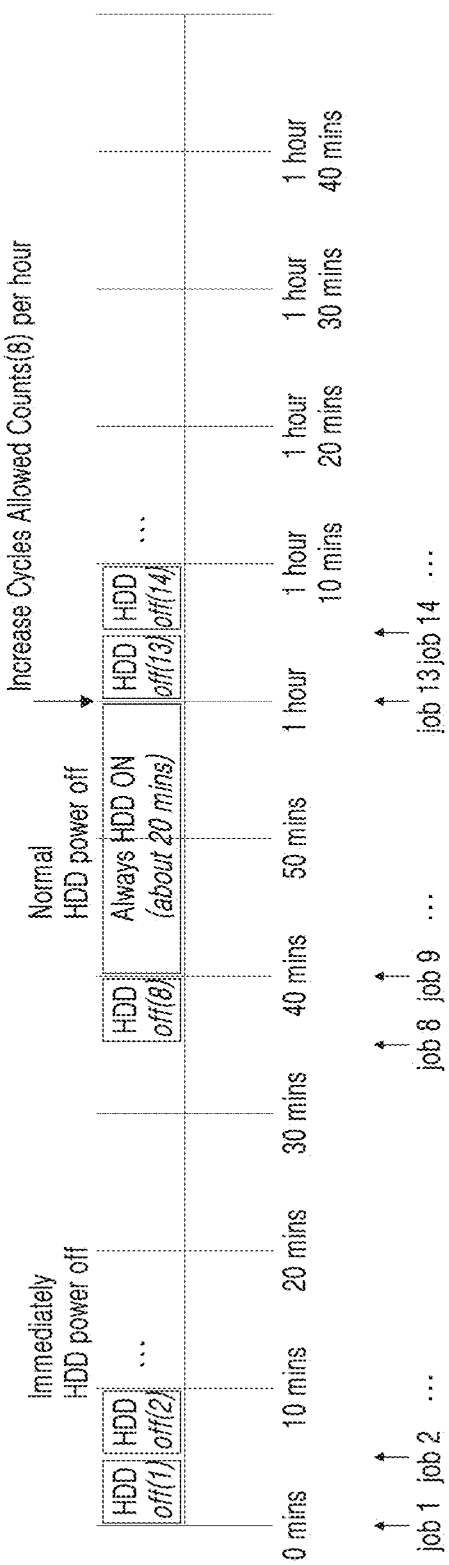
FIG. 8 is a view for explaining an operation process while switching from a normal sleep mode to a fast sleep mode, according to an example.

FIG. 8 is a view for explaining a process in which a normal sleep mode and a fast sleep mode operate while crossing, according to an example. In FIG. 8, it is assumed that the image forming apparatus performs an operation at intervals of 5 minutes and the third standby time period is 10 minutes in the case of the normal sleep mode and 20 seconds in the case of the fast sleep mode.

Referring to FIG. 8, the image forming apparatus controls the sleep mode of the hard disk to the fast sleep mode in a section from 0 mins to 40 mins, to the normal sleep mode in a section from 40 mins to 60 mins, and to the fast sleep mode after 60 mins.

As an example, because the hard disk continuously enters the sleep mode in the section between 0 mins and 40 mins, the LCC continuously increases every 5 minutes. Because the allowed number of times of the LCC increases 8 times every hour under the condition that a warranty time is 8 years and the upper limit of the LCC identified as the second time information is 600,000 times, the LCC may be equal to or greater than the allowed number of times of the LCC at a specific time point.

In the section between 40 mins and 60 mins, which is the moment that the LCC is equal to or greater than the allowed number of times of the LCC, the hard disk is conducted in the normal sleep mode and the hard disk does not enter the sleep mode, and thus the LCC may be less than the allowed number of times of the LCC at the specific time point.

According to another example, even in a situation in which the image forming apparatus does not perform any work, the usage time of the image forming apparatus is identified as the elapsed time from the user installation date to the current time or the elapsed time from the manufacturing date to the present time.

Accordingly, as time elapses, the usage time of the image forming apparatus may increase and the allowed number of times of the LCC may also increase accordingly. In other words, the driving allowed value of hard disk increases based on the passage of time regardless of whether the hard disk is actually used, and the driving information of the hard disk is a value that increases based on the hard disk actually being used. Based on the image forming apparatus managing the sleep mode of the hard disk, based on the driving allowed value and the driving information, the image forming apparatus may adaptively identify the sleep mode of the hard disk while preventing mechanical wear or damage to the hard disk.

The image forming apparatus according to an example may identify the driving allowed value for restricting the operation of the head unit by using the first time information corresponding to the image forming apparatus, the usage time information of the image forming apparatus, and the second time information corresponding to the head unit, and may adaptively identify the sleep mode of the hard disk by comparing the driving allowed value with the driving information of the head unit.

While the disclosure has been described with reference to examples thereof, it will be understood that various changes in form and details may be made without departing from the spirit and scope of the disclosure as defined by the following claims. For example, an appropriate result may be attained based on the above-described techniques being performed in a different order from the above-described method, and/or components, such as the above-described system, structure, device, and circuit, being coupled or combined in a different form from the above-described methods or substituted for or replaced by other components or equivalents thereof.

Therefore, the scope of the disclosure is defined not by the description of examples but by the appended claims and equivalents to the appended claims.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming apparatus comprising:

a hard disk unit including a head unit; and a controller to:

obtain first time information corresponding to the image forming apparatus and usage time information of the image forming apparatus, obtain second time information corresponding to the head unit and driving information of the head unit, identify a driving allowed value of the head unit at a sleep mode management time point based on the first time information, the second time information, and the usage time information, and manage a sleep mode of the hard disk unit, wherein the sleep mode is a state in which a platter of the hard disk unit has stopped spinning, based on the driving allowed value and the driving information.

2. The image forming apparatus of claim 1, wherein the driving information comprises at least one of Load Cycle Count (LCC), Loaded Hours, Load/Unload Retry Count, Load Friction, Load/Unload Cycle Count, or Load 'In'-time of the hard disk unit.

3. The image forming apparatus of claim 2, wherein the driving information comprises the LCC of the hard disk unit, wherein the second time information comprises an upper limit of the LCC, and wherein the controller is further to identify an allowed number of times of the LCC as the driving allowed value based on the first time information, the usage time information, and the upper limit of the LCC.

4. The image forming apparatus of claim 3, wherein the controller is further to:

identify whether a condition for the hard disk unit to enter the sleep mode is satisfied, identify whether the LCC is less than the allowed number of times of the LCC, and in a case where the condition for the hard disk unit is satisfied and the LCC is less than the allowed number of times of the LCC, control the hard disk unit to enter the sleep mode.

5. The image forming apparatus of claim 4, wherein, in a case where the condition for the hard disk unit is satisfied and the LCC is greater than or equal to the allowed number of times of the LCC, the controller is further to wait for a certain standby time and control the hard disk unit to enter the sleep mode.

6. The image forming apparatus of claim 1, further comprising a real time clock (RTC), wherein the usage time information is identified based on a current time using the RTC and an installation date or manufacturing date of the image forming apparatus.

7. The image forming apparatus of claim 2, wherein the driving information comprises at least a portion of Self-Monitoring, Analysis and Reporting Technology (SMART) information of the hard disk unit.

8. A sleep mode management method of an image forming apparatus, the sleep mode management method comprising:

obtaining first time information corresponding to the image forming apparatus and usage time information of the image forming apparatus;

obtaining second time information corresponding to a head unit included in a hard disk unit and driving information of the head unit;

identifying a driving allowed value of the head unit at a sleep mode management time point based on the first time information, the second time information, and the usage time information; and managing a sleep mode of the hard disk unit, wherein the sleep mode is a state in which a platter of the hard disk unit has stopped spinning, based on the driving allowed value and the driving information.

9. The sleep mode management method of claim 8, wherein the driving information comprises at least one of Load Cycle Count (LCC), Loaded Hours, Load/Unload Retry Count, Load Friction, Load/Unload Cycle Count, or Load 'In'-time of the hard disk unit.

10. The sleep mode management method of claim 9, wherein the driving information comprises the LCC of the hard disk unit, wherein the second time information comprises an upper limit of the LCC, and wherein the managing of the sleep mode of the hard disk unit further comprises identifying an allowed number of times of the LCC based on the first time information, the usage time information, and the upper limit of the LCC.

11. The sleep mode management method of claim 10, further comprising:

identifying whether a condition for entering the sleep mode is satisfied; identifying whether the LCC is less than the allowed number of times of the LCC; and entering the sleep mode in a case where the condition is satisfied and the LCC is less than the allowed number of times of the LCC.

12. The sleep mode management method of claim 11, further comprising:

in a case where the condition is satisfied and the LCC is greater than or equal to the allowed number of times of the LCC, waiting for a certain standby time; and entering the sleep mode.

13. The sleep mode management method of claim 8, further comprising identifying the usage time based on a current time using a Real Time Clock (RTC) and an installation date or a manufacturing date of the image forming apparatus.

* * * * *